(12) United States Patent
Musoll et al.

(10) Patent No.: US 7,237,093 B1
(45) Date of Patent: Jun. 26, 2007

(54) INSTRUCTION FETCHING SYSTEM IN A MULTITHREADED PROCESSOR UTILIZING CACHE MISS PREDICTIONS TO FETCH INSTRUCTIONS FROM MULTIPLE HARDWARE STREAMS

(75) Inventors: Enric Musoll, San Jose, CA (US); Mario Nemirovsky, Saragota, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 506 days.

(21) Appl. No.: 09/595,776

(22) Filed: Jun. 16, 2000

Related U.S. Application Data

(63) Continuation-in-part of application No. 09/312,302, filed on May 14, 1999, now Pat. No. 7,020,879, and a continuation-in-part of application No. 09/273,810, filed on Mar. 22, 1999, now Pat. No. 6,389,449, and a continuation-in-part of application No. 09/240,012, filed on Jan. 27, 1999, now Pat. No. 6,292,888, which is a continuation-in-part of application No. 09/216,017, filed on Dec. 16, 1998, now Pat. No. 6,477,562.

(51) Int. Cl.
*G06F 9/30* (2006.01)
(52) U.S. Cl. ................................................. 712/205
(58) Field of Classification Search ............... 712/216, 712/219, 228, 205; 718/103
See application file for complete search history.

(56) References Cited

U.S. PATENT DOCUMENTS 4,197,579 A 4/1980 Forsman et al.
4,200,927 A 4/1980 Hughes et al.
5,142,676 A 8/1992 Fried et al.
5,309,173 A 5/1994 Izzi et al.

(Continued)

FOREIGN PATENT DOCUMENTS

EP 0806730 A2 11/1997

(Continued)

OTHER PUBLICATIONS

Yoaz et al., Speculation Techniques for Improving Laod Related Instruction Scheduling, 1999, pp. 42-53.*

(Continued)

*Primary Examiner*—Eddie Chan
*Assistant Examiner*—David J. Huisman
(74) *Attorney, Agent, or Firm*—Donald R. Boys; Richard K. Huffman; James W. Huffman

(57) ABSTRACT

In a multi-streaming processor having a memory cache, a system for fetching instructions from individual ones of multiple streams to an instruction pipeline is provided, comprising a fetch algorithm for selecting from which stream to fetch an instruction, and a hit/miss predictor for forecasting whether a load instruction will hit or miss the cache. The prediction by the hit-miss predictor is used by the fetch algorithm in determining from which stream to fetch. A hit prediction results in a next instruction being fetched from the same stream as the instruction tested by the hit/miss predictor, while a miss prediction results in the next instruction being fetched from a different stream, if any. The predictor is also used to determine which instructions to dispatch to functional units.

20 Claims, 4 Drawing Sheets

U.S. PATENT DOCUMENTS

| | | | |
|---|---|---|---|
| 5,321,823 A | | 6/1994 | Grundmann et al. |
| 5,361,337 A | * | 11/1994 | Okin .................. 712/228 |
| 5,461,722 A | | 10/1995 | Goto |
| 5,511,210 A | | 4/1996 | Nishikawa et al. |
| 5,535,365 A | | 7/1996 | Barriuso et al. |
| 5,542,088 A | | 7/1996 | Jennings, Jr. et al. |
| 5,546,593 A | | 8/1996 | Kimura et al. |
| 5,561,776 A | | 10/1996 | Popescu et al. |
| 5,572,704 A | | 11/1996 | Bratt et al. |
| 5,600,837 A | | 2/1997 | Artieri |
| 5,604,877 A | * | 2/1997 | Hoyt et al. ............ 712/243 |
| 5,632,025 A | | 5/1997 | Bratt et al. |
| 5,649,144 A | | 7/1997 | Gostin et al. |
| 5,694,572 A | * | 12/1997 | Ryan .................. 711/118 |
| 5,701,432 A | | 12/1997 | Wong et al. |
| 5,713,038 A | | 1/1998 | Motomura |
| 5,745,778 A | | 4/1998 | Alfieri |
| 5,748,468 A | | 5/1998 | Notenboom et al. |
| 5,758,142 A | * | 5/1998 | McFarling et al. ...... 712/239 |
| 5,784,613 A | | 7/1998 | Tamirsa |
| 5,812,811 A | | 9/1998 | Dubey et al. |
| 5,815,733 A | | 9/1998 | Anderson et al. |
| 5,852,726 A | | 12/1998 | Lin et al. |
| 5,860,017 A | | 1/1999 | Sharangpani et al. |
| 5,867,725 A | | 2/1999 | Fung et al. |
| 5,913,049 A | | 6/1999 | Shiell et al. |
| 5,913,054 A | | 6/1999 | Mallick et al. |
| 5,933,627 A | * | 8/1999 | Parady ................ 712/228 |
| 5,946,711 A | | 8/1999 | Donnelly |
| 5,987,492 A | | 11/1999 | Yue |
| 6,016,542 A | * | 1/2000 | Gottlieb et al. ........ 712/225 |
| 6,018,759 A | | 1/2000 | Doing et al. |
| 6,029,228 A | | 2/2000 | Cai et al. |
| 6,052,708 A | | 4/2000 | Flynn et al. |
| 6,061,710 A | | 5/2000 | Eickemeyer et al. |
| 6,076,157 A | | 6/2000 | Borkenhagen et al. |
| 6,105,127 A | | 8/2000 | Kozo et al. |
| 6,115,802 A | | 9/2000 | Tock et al. |
| 6,119,203 A | | 9/2000 | Snyder et al. |
| 6,192,384 B1 | | 2/2001 | Dally et al. |
| 6,212,544 B1 | | 4/2001 | Borkenhagen et al. |
| 6,260,077 B1 | | 7/2001 | Rangarajan et al. |
| 6,308,261 B1 | * | 10/2001 | Morris et al. .......... 712/219 |
| 6,356,996 B1 | | 3/2002 | Adams |
| 6,430,593 B1 | | 8/2002 | Lindsley |
| 6,442,675 B1 | | 8/2002 | Derrick et al. |
| 6,487,571 B1 | | 11/2002 | Voldman |
| 6,493,749 B2 | | 12/2002 | Paxhia et al. |
| 6,535,905 B1 | | 3/2003 | Kalafatis et al. |
| 6,789,100 B2 | | 9/2004 | Nemirovsky et al. |
| 2003/0084269 A1 | | 5/2003 | Drysdale et al. |
| 2005/0081214 A1 | | 4/2005 | Nemirovsky et al. |

FOREIGN PATENT DOCUMENTS

| | | |
|---|---|---|
| EP | 0827071 A2 | 3/1998 |
| EP | 0953903 A2 | 11/1999 |
| JP | 2103630 | 10/1988 |
| JP | 63254530 | 10/1988 |
| JP | 4335431 | 11/1992 |
| JP | 546379 | 2/1993 |
| JP | 09506752 A2 | 6/1997 |
| JP | 1011301 A2 | 1/1998 |
| JP | 10124316 A2 | 5/1998 |
| JP | 10207717 A2 | 8/1998 |
| WO | WO9427216 A1 | 11/1994 |
| WO | WO0023891 A1 | 4/2000 |

OTHER PUBLICATIONS

Kessler, R.E., The Alpha 21264 Microprocessor: Out-of-Order Execution at 600 Mhz, Aug. 1998, pp. 18-19.*

McFarling, "WRL Technical Note TN-36: Combining Branch Predictors," 1993, p. 11-12.*

Fiske et al., "Thread Prioritization: A Thread Scheduling Mechanism for Multiple-Context Parallel Processors", 1995, pp. 210-221, IEEE.

Steere et al., "A Feedback—Driven Proportion Allocator for Real-Rate Scheduling", Third Symposium on Operating Systems Design and Implementation, Feb. 1999, pp. 145-158, USENIX Association.

Tullsen et al., "Slmultaneous Multlthreading: Maximizing on-Chip Parallelism", 22nd Annual International Symposium on Computer Architecture, Jun. 1995, Santa Margherita Ligure, Italy.

Donalson et al., "DISC: Dynamic Instruction Stream Computer, An Evaluation of Performance", 26th Hawaii Confernce on Systems Sciences, 1993, pp. 448-456, vol. 1.

Nemirovsky et al., DISC: Dynamlc Instruction Stream Computer, ACM, 1991, pp. 163-171.

Tullsen, Dean et al., Supporting Flne-Grained Synchronization on a Simultaneous Multithreading Processor, UCSD CSE Technical Report CS98-587, Jun. 1998, all pages, US.

Nemirovsky et al., "Quantitative Study of Data Caches on a Multistreamed Architecture", Workshop on Mutlithreaded Execution Archltecture and Compilation, Jan. 1998.

Li et al., "Design and Implementation of a Multlple-Instructlon-Stream Multlple-Execution-Pipeline Archltecture", 7th Internatlonal Conference on Parallel amd Distributed Computing and Systems. Oct. 1995. Washington D.C.

Yamamoto et al., Performance Estlmation of Multistreamed, Superscalar Processors, IEEE. 1994, pp. 195-204, Hawaii, US.

Yamamoto, Wayne. *An Analysis of Multistreamed, Superscalar Processor Architectures*. University of California Santa Barbara Dissertation. Dec. 1995. Santa Barbara, US.

Yamamoto et al. "Increasing Superscalar Performance Through Multistreaming." *Parallel Architectures and Compilation Techniques (PACT '95)*. 1995.

The PowerPC Architecture: *A Specification for a New Family of RISC Processors*. 2nd Ed. May 1994. pp. 70-72. Morgan Kaufmann. San Francisco, US.

*MC68020 32-Bit Microprocessor User's Manual*. 3rd Ed.. 1989. pp. 3-125, 3-126, and 3-127. Prentice Hall, NJ, US.

Potel, M.J. "Real-Time Playback in Animation Systems." *Proceedings of the 4th Annual Conference on Computer Graphics and Interactive Techniques*. 1997. pp. 72-77, San Jose, CA, US.

*ARM Architecture Reference Manual*. 1996. pp. 3-41, 3-42, 3-43, 3-67, and 3-68. Prentice Hall, NJ, US.

*ESA/390 Principles of Operation*. IBM Online Publications Center Reference No. SA22-7201-08. Table of Contents and paras. 7.5.31 and 7.5.70. IBM Corporation. Boulder, CO, US.

*MC88110 Second Generation RISC Microprocessor User's Manual*. 1991. pp. 10-66, 10-67, and 10-71. Motorola, Inc.

Diefendorff, Keith et al. "Organization of the Motorola 88110 Superscalar RISC Microprocessor." *IEEE Journal of Microelectronics*. Apr. 1992. pp. 40-63. vol. 12, No. 2. IEEE. New York, NY, US.

Kane, Gerry. *PA-RISC 2.0 Architecture*. 1996, pp. 7-106 and 7-107. Prentice Hall. NJ, US.

Difendorff, Keith et al. "AltiVec Extension to PowerPC Accelerates Media Processing." *IEEE Journal of Microelectronics*. vol. 20, No. 2 (2000): pp. 85-95.

Grunewald, Winfried et al. "Towards Extremely Fast Context Switching in a Block Multithreaded Processor." *Proceedings of EUROMICRO 22*, 1996. pp. 592-599.

Bradford, Jeffrey et al. "Efficient Synchronization for Multithreaded Processors." *Workshop on Multithreaded Execution, Architecture, and Compilation*. Jan.-Feb. 1998. pp. 1-4.

Pai, Vijay et al. "An Evaluation of Memory Consistency Models for Shared-Memory Systems with ILP Processors." *Proceedings of ASPLOS-VII*, Oct. 1996: pp. 12-23, ACM, Inc.

Yoaz et al. "Speculation Techniques for Improving Load Related Instruction Scheduling." 1999. pp. 42-53, IEEE.

Kessler, R. E. "The Alpha 2164 Microprocessor: Out-of-Order Execution at 600 MHz." Aug. 1998.

Donaldson et al. "DISC: Dynamic Instruction Stram Computer, An Evaluation of Performance." 26th *Hawaii Conference on Systems Sciences*. vol. 1. 1993. pp. 448-456.

Nemirovsky et al. "DISC: Dynamic Instruction Stream Computer." ACM. 1991. pp. 163-171.

Nemorovisky, Mario D., "DISC: A Dynamic Instruction Stream Computer," 1990, UMI, Ann Arbor, MI.

Diefendorff, Keith, "Compaq Chooses SMT for Alpha," Dec. 6, 1999, Microprocessor Report.

Diefendorff, Keith, "WinChip 4 Thumbs Nose At ILP," Microprocessor Report, Dec. 7, 1998, vol. 12, No. 16.

Diefendorff, Keith, "Jalapeño Powers Cyrix's M3," Microprocessoe Report, Nov. 16, 1998, vol. 12, No. 15.

Slater, Michael, "Rise Joins x86 Fray with mP6," Microprocessor Report, Nov. 16, 1998, vol. 12, No. 15.

Eggers et al., "Simultaneous Multithreading: A Platform for Next-Generation Processors," IEEE Micro, Sep./Oct. 1997.

Becker et al., "The PowerPC 601 Microprocessor," IEEE Micro, Oct. 1993.

U.S. Appl. No. 09/592,106, filed Jun. 12, 2000, Melvin et al.

U.S. Appl. No. 09/595,776, filed Jun. 16, 2000, Musoll et al.

U.S. Appl. No. 09/616,385, filed Jul. 14, 2000, Musoll et al.

U.S. Appl. No. 09/629,805, filed Jul. 31, 2000, Nemirovsky et al.

Cui et al., Parallel Replacement Mechanism for MultiThread, Advances in Parallel and Distributed Computing, 1997. Proceedings, IEEE, Mar. 21, 1977, pp. 338-344.

Thekkath et al. The Effectiveness of Multiple Hardware Contexts. In Proceedings of the 6th International Conference on Architectural Support for Programming Languagesand Operating Systems, pp. 328-337, San Jose, CA, Oct. 1994. ACM.

Ungerer et al. A Survey of Processors with Explicit Multithreading. ACM Computing Surveys, vol. 35, No. 1. Mar. 2003. pp. 29-63.

Kapps et al. "VAX Assembly Language and Architecture." Prindle, Weber & Schmidt. Boston, 1985, pp. 239-241.

Tanenbaum, Andrew S. "Structured Computer Organization." 2nd Edition, 1984, Prentice-Hall, pp. 10-12 and 204-221.

* cited by examiner

| | |
|---|---|
| Fetch | INST A |
| Decode | INST B |
| Read | INST C |
| Dispatch | INST D |
| Execute | INST E |
| Access | INST F |
| Write | INST G |

*Fig. 1a*

| | |
|---|---|
| Fetch | INST H |
| Decode | INST A |
| Read | INST B |
| Dispatch | INST C |
| Execute | INST D |
| Access | INST E |
| Write | INST F |

*Fig. 1b*

| | |
|---|---|
| Fetch | INST I |
| Decode | INST H |
| Read | INST A |
| Dispatch | INST B |
| Execute | INST C |
| Access | INST D |
| Write | INST E |

*Fig. 1c*

| | |
|---|---|
| Fetch | INST J |
| Decode | INST I |
| Read | INST H |
| Dispatch | INST A |
| Execute | INST B |
| Access | INST C |
| Write | INST D |

*Fig. 1d*

INSTRUCTION FETCHING SYSTEM IN A MULTITHREADED PROCESSOR UTILIZING CACHE MISS PREDICTIONS TO FETCH INSTRUCTIONS FROM MULTIPLE HARDWARE STREAMS

CROSS REFERENCE TO RELATED DOCUMENTS

The present application is a continuation-in-part (CIP) of prior patent applications Ser. No. 09/216, 017, filed Dec. 16, 1998 now U.S. Pat. No. 6,477,562, Ser. No. 09/240,012, filed Jan. 27, 1999 now U.S. Pat. No. 6,292,888, Ser. No. 09/273,810, filed Mar. 22, 1999 now U.S. Pat. No. 6,389, 449, and Ser. No. 09/312,302 filed May 14, 1999 now U.S. Pat. No. 7,020,879, all four of which are incorporated herein in their entirety by reference.

FIELD OF THE INVENTION

The present invention is in the area of microprocessors, and pertains more particularly to structure and function of simultaneous multithreaded processors.

BACKGROUND OF THE INVENTION

Multi-streaming processors capable of processing multiple threads are known in the art, and have been the subject of considerable research and development. The present invention takes notice of the prior work in this field, and builds upon that work, bringing new and non-obvious improvements in apparatus and methods to the art.

For purposes of definition, this specification regards a stream in reference to a processing system as a hardware capability of the processor for supporting and processing an instruction thread. A thread is the actual software running within a stream. For example, a multi-streaming processor implemented as a CPU for operating a desktop computer may simultaneously process threads from two or more applications, such as a word processing program and an object-oriented drawing program. As another example, a multi-streaming-capable processor may operate a machine without regular human direction, such as a router in a packet switched network. In a router, for example, there may be one or more threads for processing and forwarding data packets on the network, another for quality-of-service (QoS) negotiation with other routers and servers connected to the network and another for maintaining routing tables and the like. The maximum capability of any multi-streaming processor to process multiple concurrent threads remains fixed at the number of hardware streams the processor supports.

A multi-streaming processor operating a single thread runs as a single-stream processor with unused streams idle. For purposes of discussion, a stream is considered on active stream at all times the stream supports a thread, and otherwise inactive. As in various related cases listed under the cross-reference section, and in papers provided by IDS, which were included with at least one of the cross-referenced applications, superscalar processors are also known in the art. This term refers to processors that have multiples of one or more types of functional units, and an ability to issue concurrent instructions to multiple functional units. Most central processing units (CPUs) built today have more than a single functional unit of each type, and are thus superscalar processors by this definition. Some have many such units, including, for example, multiple floating point units, integer units, logic units, load/store units and so forth. Multi-streaming superscalar processors are known in the art as well.

State-of-the-art processors typically employ pipelining, whether the processor is a single streaming processor, or a dynamic multi-streaming processor. As is known in the art, pipelining is a technique in which multiple instructions are queued in steps leading to execution, thus speeding up instruction execution. Most processors pipeline instruction execution, so instructions take several steps until they are executed. A brief description of typical stages in a RISC architecture is listed immediately below:
 a) Fetch stage: instructions are fetched from memory
 b) Decode stage: instructions are decoded
 c) Read/Dispatch stage: source operands are read from register file
 d) Execute stage: operations are executed, an address is calculated or a branch is resolved
 e) Access stage: data is accessed
 f) Write stage: the result is written in a register Pipeline stages take a single clock cycle, so the cycle must be long enough to allow for the slowest operation. The present invention is related to the fact that there are situations in pipelining when instructions cannot be executed. Such events are called hazards in the art. Commonly, there are three types of hazards:
 a) Structural
 b) Data
 c) Control A structural hazard means that there are not adequate resources (e.g., functional units) to support the combination of instructions to be executed in the same clock cycle. A data hazard arises when an instruction depends on the result of one or more previous instructions not resolved. Forwarding or bypassing techniques are commonly used to reduce the impact of data hazards. A control hazard arises from the pipelining of branches and other instructions that change the program counter (PC). In this case the pipeline may be stalled until the branch is resolved.

Stalling on branches has a dramatic impact onto processor performance (measured in instructions executed per cycle or IPC). The longer the pipelines and the wider the superscalar, the more substantial is the negative impact. Since the cost of stalls is quite high, it is common in the art to predict the outcome of branches. Branch predictors predict branches as either taken or untaken and the target address. Branch predictors may be either static or dynamic. Dynamic branch predictors may change prediction for a given branch during program execution.

A typical approach to branch prediction is to keep a history for each branch, and then to use the past to predict the future. For example, if a given branch has always been taken in the past, there is a high probability that the same branch will be taken again in the future. On the other hand, if the branch was taken 2 times, not taken 5 times, taken again once, and so forth, the prediction made will have a low confidence level. When the prediction is wrong, the pipeline must be flushed, and the pipeline control must ensure that the instructions following the wrongly guessed branch are discarded, and must restart the pipeline from the proper target address. This is a costly operation.

Multistreaming processor architectures may be either fine-grained or coarse-grained. Coarse-grained multistreaming processors typically have multiple contexts, which are used to cover long latencies arising, for example, due to cache misses. Only a single thread is executing at a given time. In contrast, fine-grained multistreaming technologies such as Dynamic Multi-Streaming (DMS), which is a development of XStream Logic, Inc., with which the present inventors are associated, allow true multi-tasking or multi-streaming in a single processor, concurrently executing instructions from multiple distinct threads or tasks. DMS processors implement multiple sets of CPU registers or hardware contexts to support this style of execution.

Increasing the relative amount of instruction level parallelism (ILP) for a processor reduces data and control hazards, so applications can exploit increasing number of functional units during peak levels of parallelism, and Dynamic Multi-Streaming (DMS) hardware and techniques within today's general-purpose superscalar processors significantly improves performance by increasing the amount of ILP, and more evenly distributing it within workload. There are still occasions, however, for degraded performance due to poor selection in fetching and dispatching instructions in a DMS processor.

What is clearly needed is improved methods and apparatus for utilizing hit/miss prediction in pipelines in dynamic multi-streaming processors, particularly at the point of fetch and dispatch operations.

SUMMARY OF THE INVENTION

In a preferred embodiment of the present invention, in a multi-streaming processor having a data cache, a system for fetching instructions from individual ones of the multiple streams to a pipeline is provided, comprising a fetch algorithm for selecting from which stream to fetch instructions, and a hit/miss predictor for forecasting whether instructions will hit or miss the data cache. The prediction by the hit-miss predictor is used by the fetch algorithm in determining from which stream to fetch.

In preferred embodiments a hit prediction precipitates no change in the fetching process, while a miss prediction results in switching fetching to a different stream. In some cases the hit-miss predictor determines a hit probability, and the probability is used by the fetch algorithm in determining from where to fetch next instructions. In some other embodiments the forecast of the hit/miss predictor is also used by a dispatch algorithm in selecting instructions from the pipeline to dispatch to functional units.

In another aspect of the invention a multi-streaming processor is provided, comprising a data cache, a fetch algorithm for selecting from which stream to fetch instructions, and a hit/miss predictor for predicting whether instructions will hit or miss the cache. A prediction by the hit-miss predictor is used by the fetch algorithm in determining from which stream to fetch.

In preferred embodiments of the invention a hit prediction precipitates no change in the fetching process, while a miss prediction results in switching fetching to a different stream. In some embodiments the hit-miss predictor determines a hit probability, and the probability is used by the fetch algorithm in determining from where to fetch instructions.

In some embodiments the forecast of the hit/miss predictor is also used by a dispatch algorithm in selecting instructions from the pipeline to dispatch to functional units.

In yet another aspect of the invention, in a multi-streaming processor having a data cache, a method for fetching instructions from individual ones of multiple streams as instruction sources to a pipeline is provided, comprising the steps of (a) making a hit/miss prediction by a predictor as to whether instructions previously fetched will hit or miss the data cache; and (b) if the prediction is a miss, altering the source of the fetch. In some embodiments the hit-miss predictor determines a hit probability, and the probability is used in determining fetch source. In other embodiments the forecast of the hit/miss predictor is also used by a dispatch algorithm in selecting instructions to dispatch to functional units.

In embodiments of the invention taught in enabling detail below, for the first time a prediction technique is brought to the process of fetching and dispatching instruction in multistreaming processors.

BRIEF DESCRIPTION OF THE DRAWING FIGURES

FIG. 1a is a simplified diagram of a pipeline in an embodiment of the present invention.

FIG. 1b shows the pipeline of FIG. 1a after a cycle.

FIG. 1c shows the pipeline of FIGS. 1a and 1b after another cycle.

FIG. 1d shows the pipeline of FIGS. 1a, 1b and 1c after yet another cycle.

DESCRIPTION OF THE PREFERRED EMBODIMENTS

Figure 2:
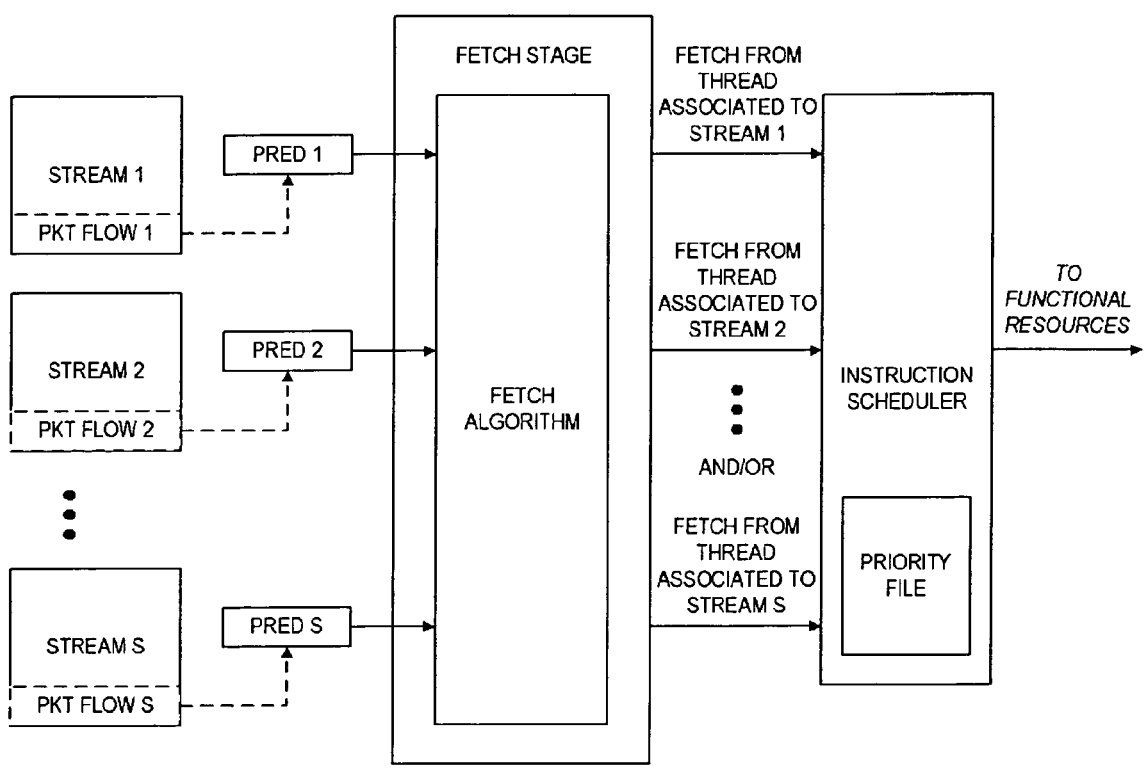
FIG. 2 is a schematic diagram associating predictors with streams in an embodiment of the present invention.

FIG. 1a is a simplified diagram of a pipeline in a dynamic, multi-streaming (DMS) processor according to an embodiment of the present invention. In this simplified view the pipeline has seven stages, which are fetch, decode, read, dispatch, execute, access and write. These are the same as described in the background section above, except for the separation of read and dispatch in FIG. 1a to illustrate the functions. Dispatch is important in the present invention in that the present invention adds intelligence to Dispatch, improving the performance of the processor. The fetch stage in the pipeline fetches instructions into the pipeline from the multiple streams, and in an embodiment of the present invention is capable of selective fetching.

Although there is no requirement in operating processors that there be instructions at each stage of a pipeline, it is often true that this is the case, and the inventors choose to illustrate each stage as occupied by a single instruction to avoid confusion in description. In many cases there will be a plurality of instructions at various stages, or none at all.

In FIG. 1a the instructions in the pipeline are arbitrarily indicated as instructions A through G, at successive stages in the pipeline at one point in time. FIG. 1b shows the pipeline of FIG. 1a one cycle later. Note that instruction A has moved from fetch to decode, and the other instructions shown in FIG. 1a have moved one stage forward as well. Also, a new instruction, H, has entered the pipeline at the fetch stage.

FIG. 1c shows the same pipeline one cycle later. All instructions have moved forward one further stage, and a new instruction I has entered the pipeline at the fetch stage. FIG. 1d shows the same pipeline after yet another cycle, at which point in time the instructions have moved forward yet again, and yet another instruction J has entered the pipeline.

Note that after the fourth cycle, instruction A has moved from fetch to dispatch. Assume for the sake of this example that instruction A is a load instruction for loading a data value from cache. If this is the case, there will be some probability as to whether the particular data is in cache or not. In the art this is known as the hit/miss probability. If the data is in the cache, the system scores a hit. If not, the system scores a miss.

The combination of hit/miss probability for load operations with pipelined architecture has significance for processor efficiency, because, in the conventional case the general sequence of instructions in the pipeline will be from a single thread, and will typically be related in that many instructions following a load instruction may depend upon the result of whatever instruction is to use the data loaded. That is, until the resolution of whatever instruction is to use the data loaded, many following instructions cannot be executed, except in some cases, on a speculative basis.

Conventional processors simply assume a hit when a load instruction enters a pipeline. If the load is a miss, however, once the load instruction is executed, then it may take a number of cycles for the needed data, not in cache, to be loaded from memory. And, unfortunately, the miss will not be apparent until the load instruction is dispatched and executed. The following instructions have to stall until the data is loaded and the instruction(s) depending on the data are executed.

The present inventors provide apparatus and method for reducing the impact of data cache misses in multithreaded architectures. The technique consists of predicting, for each of the threads running in the multiple streams of the DMS, whether the next access to the data cache will result in a miss. If this is the case, then (generally):

The stream can be given a lower priority when deciding, in the fetch stage, from which stream to fetch, and The dependent instructions of the instruction that accesses the data cache can be more efficiently dispatched to the functional units (FU's) in the dispatch stage.

This new apparatus and technique improves the performance of a multistreaming processor in the fetching and dispatching of instructions.

Fetch

The new technique takes advantage of the fact that, in a DMS processor, as instructions are fetched to the pipeline from individual ones of the streams, there is freedom in choosing a fetching policy or algorithm that will select, on a cycle-by-cycle basis, from which stream instructions are to be fetched.

In a multistreaming architecture, without the technique proposed here, a typical event that causes a thread switch is a data cache miss. Since the required data may take several cycles to be available (the exact number depending on where the data really resides in the memory hierarchy of the processor), the thread that missed the data cache may be switched out since the dependent instructions of the instruction that missed most likely will not execute due to the dependencies on the data. Thus, more work can be done by fetching and executing instructions from another thread. In this case, the instructions following the one that missed, and that have already been fetched, will need to be flushed out, thus degrading the performance of the processor with respect to the case in which useful instructions had been fetched.

If the fact that an instruction will miss the data cache could be known early in the process the fetching of instructions that might eventually be flushed may be avoided by fetching, instead of the instructions following the instruction that missed the data cache, instructions from another stream, improving the likelihood that the fetched instructions may be quickly executed. Thus, a fetching algorithm, in an embodiment of the present invention, may take into account, for all the streams, the predictions on whether the next access will miss the data cache, and fetch from the stream running a thread that is most likely to have its instructions executed and committed.

There already exist in the art a variety of implementations for hit-miss predictors. The goal, however, is always the same: to predict with the highest accuracy both the hits and misses to the data cache. Moreover, a desirable property of such a predictor is to be able to predict the next access to the data cache as soon as possible so that fewer instructions (that would eventually be flushed out) will enter the pipeline.

The technique taught herein can be improved by associating a confidence level to the prediction. The predictor, in one embodiment of the invention, operating at the fetch stage, in addition to predicting also generates this confidence level value. The confidence level helps the fetching algorithm, for example, in cases in which two or more predictors predicted a miss in the data cache and one is selected to be switched out. In this case, the stream with higher confidence level will be selected.

FIG. 2 is a schematic diagram of a fetching algorithm in a multistreaming architecture. The multistreaming architecture corresponds to a processor having multiple hardware streams STREAM 1-STREAM S supporting multiple data threads and a data cache (not shown). The schematic diagram shows a system according to the present invention for fetching instructions from one to P of the multiple hardware streams STREAM 1-STREAM S, where P is less than the number of multiple hardware streams STREAM 1-STREAM S. The diagram shows multiple hit/miss predictors PRED 1-PRED S, each associated with a corresponding one of the multiple hardware streams STREAM 1-STREAM S, and each configured to forecast whether corresponding instructions from the corresponding one of the multiple hardware streams STREAM 1-STREAM S will hit or miss the data cache, where the multiple hit/miss predictors PRED 1-PRED S forecast whether the corresponding instructions from the corresponding one of the multiple hardware streams will hit or miss the data cache prior to when the corresponding instructions enter into a dispatch stage (not shown) in the pipeline. The diagram also shows a fetch stage that is coupled to the multiple hit/miss predictors PRED 1-PRED S. The fetch stage is configured to simultaneously fetch every cycle, the instructions from the one to P of the multiple hardware streams STREAM 1-STREAM S to the pipeline. The fetch stage is additionally configured to select, on a cycle-by-cycle basis, the one to P of the multiple hardware streams STREAM 1-STREAM S from which to fetch the instructions. The diagram also depicts an instruction scheduler that is coupled to the fetch stage. The instruction scheduler manages access for the multiple hardware streams STREAM 1-STREAM S to a set of functional resources (not shown) for processing instructions from the multiple hardware streams STREAM 1-STREAM S, where at any point in time, said instruction scheduler manages access for a given one of the multiple hardware streams STREAM 1-STREAM S according to a priority record within a priority file, regardless of any priority associated with the multiple data threads. The fetch stage includes a fetch algorithm. The algorithm decides from which stream(s) STREAM 1-STREAM S to fetch based on cache hit/miss predictors associated to each of the streams STREAM 1-STREAM S. In FIG. 2 a predictor PRED 1-PRED Sis associated with streams 1, 2, and so on through stream S. Thus, theoretically, instructions from up to S streams STREAM 1-STREAM S (S being the maximum number of streams STREAM 1-STREAM S supported by the multistreaming architecture) can be simultaneously fetched every cycle. In reality, however, the fetching algorithm might be restricted to fetch instructions from P streams (P<S) due to implementation restrictions (for example, availability of instruction cache ports). Moreover, the fetching algorithm might select from which streams to fetch based on other information (for example, confidence on the branch predication of each stream, thread priorities, state of the pipeline, etc.)

So far, we have mentioned predictors of hit/miss for the data cache. Note that the data cache might be implemented for performance reasons in different levels (the first level—L1—being the closest to the processor core). In alternative embodiments of the invention different hit/miss predictors may exist for each of the data cache levels.

The fetching algorithm in alternative embodiments of the present invention may base selection of instructions to be fetched on the prediction for the second level—L2—of data cache since, in most processor systems, a miss in the second level of cache is very costly in number of cycles (whereas the penalty of a miss in the L1 is comparatively relatively small).

Dispatch

The technique of having a data cache hit/miss predictor is also useful in the process of deciding, at the dispatch stage in the pipeline, which instructions are to be extracted from the instruction queue (if any) and sent to the functional units (FUs) for execution.

In current art, when an instruction (henceforth called a producer) generates a read access to the data cache, the latency of the result is not known until the data cache is accessed and the hit/miss outcome is determined. The dispatch of a dependent instruction (henceforth termed a consumer) on the data generated by the producer can follow two policies:

a) Dispatch the instruction only when it is guaranteed that the data will be available.
b) Dispatch the instruction assuming that the producer will hit in the first level of the data cache.

Policy (b), then, dispatches the consumer instruction speculatively (a hit is always assumed for the producer instruction since the hit ratio in a cache is usually very high). If the consumer instruction arrives to the FU and the data is still not available, the instruction has to either stall at the FU or be rescheduled for dispatch in a later cycle (this option will allow other non-dependent instructions to be dispatched to the FU). In any case, both options degrade the performance of the processor.

Policy (a) provides the lowest performance since the consumer instruction might be unnecessarily stalled before it is dispatched. The consumer instruction will be dispatched as soon as the producer hits in the data cache or, in case it misses, when the missing data arrives from the next level of memory hierarchy. On the other hand, this policy provides the simplest implementation, since no re-scheduling will occur.

In an embodiment of the present invention a hit/miss predictor enhances the performance of policy (b) by predicting whether the producer will hit in the data cache. Thus, the consumer instructions of a producer that is predicted to miss in the data cache will be dispatched following policy (a). If the producer instruction is predicted to hit, then the dispatch policy is (b). In this case, however, the re-scheduling logic is still needed in case the predictor is incorrect. Only in the case in which the prediction is a hit but the real outcome is a miss, the consumer instructions will need to be either stalled at the FUs or re-scheduled.

Figure 3:
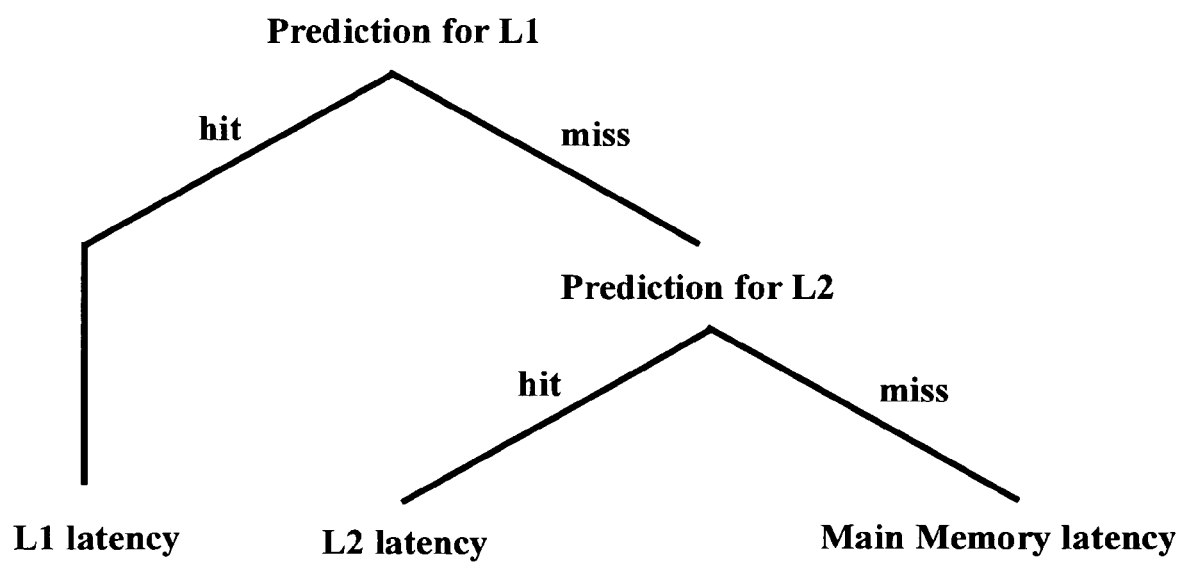
FIG. 3 is a schematic showing predictors for different levels in cache.

In general, the hit/miss predictor operating at the dispatch level optimizes the dispatch of consumer instructions by predicting the latency of the data. If a hit in the L1 is predicted, the latency of the data is predicted to be the latency of the L1 cache. If a miss is predicted, the predicted latency of the data depends on whether more levels of cache exist and on whether a hit/miss predictor exists for each of these levels. If, for example, two levels of cache exist and the hit/miss outcome of the L2 is also predicted, the predicted latency of the data is computed as shown in FIG. 3 (Note: the necessary cycles, if any, to bring the data from the output of the cache to the input of the functional unit where the consumer will be executed need to be added to the predicted latency of the data).

Figure 4:
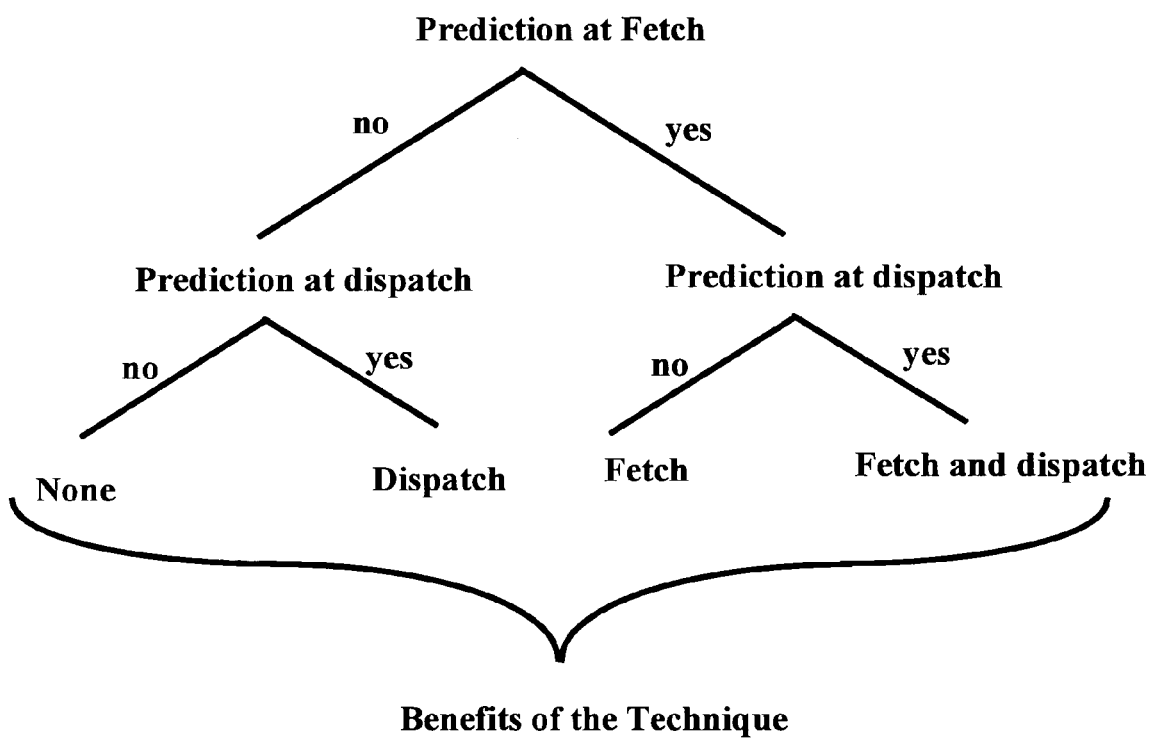
FIG. 4 is a schematic illustrating benefits of the technique in embodiments of the invention

The benefits of a hit/miss predictor for dispatch logic are not restricted to multistreaming processors only, but in a multistreaming processor where the technique has larger benefits than in a conventional (single-streaming) processor architecture. In a conventional processor having a data hit/miss predictor, when a data cache miss is predicted, no instructions (in case of an in-order dispatch engine), or only those that do not depend on the missing data (in case of an out-of-order dispatch engine) can execute. In any case, the processor resources might be idle for several cycles until the missing data is available. In multistreaming processors those idle cycles can be used to execute other instructions from other threads since they do not depend on the missing data. Thus, for a multistreaming processor, the benefits of a data cache hit/miss predictor are twofold as shown in FIG. 4.

In alternative embodiments of the invention the prediction can be done differently at the fetch and dispatch stages (i.e. using different information on which to base the prediction and/or using a different prediction algorithm). As an example, the prediction at the dispatch stage could use the program counter (PC) address of the consumer instruction (since the instruction has already been decoded and its PC is known) and could follow an algorithm similar to the prediction schemes used in branch prediction. The prediction at the fetch stage may use another type of address (cache line, for example) or other non-address information.

The prediction algorithm in different embodiments may vary depending on the workload that the processor has to efficiently support. For traditional applications, like Windows programs or SPEC benchmarks, similar algorithms to those used in branch prediction may produce the desired prediction accuracy in both hits and misses. For other types of workloads, like packet processing applications in network processors, the predictors can take advantage of additional information, like the flow number to which the packet being processed belongs (the data cache accesses performed by the processing of the first packet(s) of a new flow most likely will miss).

It will be apparent to the skilled artisan that there are many alterations that might be made in the embodiments of the invention taught herein without departing from the spirit and scope of the invention. The hit-miss predictors may be implemented in various ways, for example, and different actions may be taken based on assigned probabilities. Further, the predictors may be used at different levels in a pipeline. For example, a predictor may have input from a decode stage, and output to a fetch algorithm. Further, the mechanisms to accomplish different embodiments of the invention may be implemented typically in either hardware or software. There are similarly many other alterations that may be made within the spirit and scope of the invention. The invention should be accorded the scope of the claims below.

What is claimed is:

1. In a processor having multiple hardware streams supporting multiple data threads, and a data cache, a system for fetching instructions from one to P of the multiple hardware streams to a pipeline, where P is less than the number of multiple hardware streams, the system comprising:

multiple hit/miss predictors, each associated with a corresponding one of the multiple hardware streams, said each configured to forecast whether corresponding instructions from said corresponding one of the multiple hardware streams will hit or miss the data cache, wherein said multiple hit/miss predictors forecast whether said corresponding instructions from said corresponding one of the multiple hardware streams will hit or miss the data cache prior to when said corresponding instructions enter into a dispatch stage in the pipeline;

a fetch stage, coupled to said multiple hit/miss predictors, configured to simultaneously fetch every cycle, the instructions from the one to P of the multiple hardware streams to the pipeline, and configured to select, on a cycle-by-cycle basis, the one to P of the multiple hardware streams from which to fetch the instructions; and an instruction scheduler, coupled to said fetch stage, for managing access for the multiple hardware streams to a set of functional resources for processing instructions from the multiple hardware streams, wherein at any point in time, said instruction scheduler manages access for a given one of the multiple hardware streams according to a priority record, regardless of any priority associated with the multiple data threads.

2. The system as recited in claim 1, wherein a hit prediction precipitates no change in the fetching of the instructions.

3. The system as recited in claim 1, wherein a miss prediction results in switching the fetching to different ones of the multiple hardware streams.

4. The system as recited in claim 1, wherein said each of said multiple hit/miss predictors generates a confidence level value, and said confidence level value is used by said fetch algorithm to select the P of the multiple hardware streams.

5. The system as recited in claim 1, wherein said multiple hit/miss predictors further operate at a dispatch level to optimize the dispatch of consumer instructions by predicting latency of data.

6. A processor having multiple hardware streams supporting multiple data threads, the processor comprising:

a data cache, comprising a plurality of levels;

multiple hit/miss predictors, each associated with a corresponding one of the multiple hardware streams, said each configured to forecast whether corresponding instructions from said corresponding one of the multiple hardware streams will hit or miss said data cache, wherein said multiple hit/miss predictors forecast whether said corresponding instructions from said corresponding one of the multiple hardware streams will hit or miss said data cache prior to when said corresponding instructions enter into a dispatch stage in a pipeline of the processor, said each of said multiple hit/miss predictors comprising:

a plurality of hit/miss predictors, each configured to forecast whether said corresponding instructions from said corresponding one of the multiple hardware streams will hit or miss one or more of said levels;

a fetch stage, coupled to said multiple hit/miss predictors, for simultaneously fetching every cycle, instructions from one to P of the multiple hardware streams, wherein P is less than the number of the multiple hardware streams, and configured to select, on a cycle-by-cycle basis, said one to P of the multiple hardware streams from which to fetch said instructions, wherein said fetch stage selects said one to P of the multiple hardware streams based upon whether said corresponding instructions from said corresponding one of the multiple hardware streams will hit or miss said one or more of said levels; and an instruction scheduler, coupled to said fetch stage, for managing access for the multiple hardware streams to a set of functional resources for processing instructions from the multiple hardware streams, wherein at any point in time, said instruction scheduler manages access for a given one of the multiple hardware streams according to a priority record, regardless of any priority associated with the multiple data threads.

7. The processor as recited in claim 6, wherein a hit prediction precipitates no change in the fetching of said instructions.

8. The processor as recited in claim 6, wherein a miss prediction results in switching the fetching to different ones of the multiple hardware streams.

9. The processor as recited in claim 6, wherein said each of said multiple hit/miss predictors generates a confidence level value, and said confidence level value is used by said fetch stage to select said one to P of the multiple hardware streams.

10. The processor as recited in claim 6, wherein said multiple hit/miss predictors further operate at a dispatch level to optimize the dispatch of consumer instructions by predicting latency of data.

11. In a processor having multiple hardware streams supporting multiple data threads, and a data cache, a method for simultaneously fetching instructions every cycle from one to P of the multiple hardware streams to a pipeline, where P is less than the number of the multiple hardware streams, the method comprising:

for each of the multiple hardware streams, making a hit/miss prediction by a corresponding one of associated hit/miss predictors as to whether corresponding instructions for the each of the multiple hardware streams previously fetched will hit or miss the data cache, wherein said making is performed prior to when the corresponding instructions enter into a dispatch stage in the pipeline; and selecting, on a cycle-by-cycle basis, the one to P of the multiple hardware streams from which to fetch the instructions; and managing access for the multiple hardware streams to a set of functional resources for processing instructions from the multiple hardware streams, wherein at any point in time, said managing for a given one of the multiple hardware streams is accomplished according to a priority record, regardless of any priority associated with the multiple data threads.

12. The method as recited in claim 11, wherein said making comprises:

generating a confidence level value, and employing the confidence level to select the one to P of the multiple hardware streams.

13. The method as recited in claim 11, further comprising:
further operating the multiple hit/miss predictors at a dispatch level to optimize the dispatch of consumer instructions by predicting latency of data.

14. The system as recited in claim 1, wherein the processor comprises a fine-grained multistreaming processor that concurrently executes the instructions from the multiple hardware streams.

15. The system as recited in claim 1, wherein the data cache comprises:
a first level and a second level, and wherein said each of said multiple hit/miss predictors comprises:
a first hit/miss predictor, configured to forecast whether said corresponding instructions from said corresponding one of the multiple hardware streams will hit or miss said first level; and
a second hit/miss predictor, configured to forecast whether said corresponding instructions from said corresponding one of the multiple hardware streams will hit or miss said second level;
wherein said fetch stage selects the one to P of the multiple hardware streams based upon whether said corresponding instructions from said corresponding one of the multiple hardware streams will hit or miss said second level.

16. The system as recited in claim 1, wherein the processor comprises a network processor, and wherein said each of said multiple hit/miss predictors employs a flow number to which a packet belongs to forecast whether said corresponding instructions from said corresponding one of the multiple hardware streams will hit or miss the data cache.

17. The processor as recited in claim 6, wherein the processor comprises a network processor, and wherein said each of said multiple hit/miss predictors employs a flow number to which a packet belongs to forecast whether said corresponding instructions from said corresponding one of the multiple hardware streams will hit or miss the data cache.

18. The method as recited in claim 11, wherein said selecting comprises:
switching the fetching to a different one to P of the multiple hardware streams.

19. The method as recited in claim 11, wherein the data cache comprises a first level and a second level, and wherein said making comprises:
first forecasting whether said corresponding instructions from the corresponding one of the multiple hardware streams will hit or miss the first level; and
second forecasting whether the corresponding instructions from the corresponding one of the multiple hardware streams will hit or miss the second level; and
wherein said selecting comprises:
choosing the one to P of the multiple hardware streams based upon whether the corresponding instructions from the corresponding one of the multiple hardware streams will hit or miss the second level.

20. The method as recited in claim 11, wherein said making comprises:
employing a flow number to which a packet belongs to forecast whether the corresponding instructions from the corresponding one of the multiple hardware streams will hit or miss the data cache.

* * * * *